US012761629B2

(12) United States Patent
Zheng et al.

(10) Patent No.: US 12,761,629 B2
(45) Date of Patent: Oct. 13, 2026

(54) ELEMENT PLACEMENT ON 3D SURFACES

(71) Applicants: Peridot Print LLC, Palo Alto, CA (US); Nanyang Technological University, Singapore (SG)

(72) Inventors: Jianmin Zheng, Singapore (SG); Weidan Xiong, Singapore (SG); Jun Zeng, Palo Alto, CA (US); Edward Dale Davis, San Diego, CA (US)

(73) Assignees: PERIDOT PRINT LLC, Palo Alto, CA (US); Nanyang Technological University, Singapore (SG)

( * ) Notice: Subject to any disclaimer, the term of this patent is extended or adjusted under 35 U.S.C. 154(b) by 348 days.

(21) Appl. No.: 18/279,130

(22) PCT Filed: Mar. 10, 2021

(86) PCT No.: PCT/US2021/021669

§ 371 (c)(1),
(2) Date: Aug. 28, 2023

(87) PCT Pub. No.: WO2022/191831

PCT Pub. Date: Sep. 15, 2022

(65) Prior Publication Data

US 2024/0134344 A1 Apr. 25, 2024
US 2024/0231311 A9 Jul. 11, 2024

(51) Int. Cl.

| | |
|---|---|
| ***G05B 19/4099*** | (2006.01) |
| ***G06T 15/00*** | (2011.01) |
| ***G06T 17/20*** | (2006.01) |
| ***G06T 19/20*** | (2011.01) |

(52) U.S. Cl.

CPC .......... *G05B 19/4099* (2013.01); *G06T 15/00* (2013.01); *G06T 17/20* (2013.01); *G06T 19/20* (2013.01); *G05B 2219/49023* (2013.01); *G06T 2219/2004* (2013.01)

(58) Field of Classification Search

None
See application file for complete search history.

(56) References Cited

U.S. PATENT DOCUMENTS

| | | | |
|---|---|---|---|
| 6,947,879 | B2 | 9/2005 | Yamada et al. |
| 8,477,133 | B2 | 7/2013 | Kim et al. |
| 9,401,044 | B1 | 7/2016 | Kaufman |
| 2005/0128211 | A1 | 6/2005 | Berger et al. |
| 2013/0222368 | A1 | 8/2013 | Takama et al. |
| 2017/0124753 | A1 | 5/2017 | Arisman |
| 2018/0093418 | A1 | 4/2018 | Lappas et al. |
| 2020/0096969 | A1 | 3/2020 | Hinkel |

FOREIGN PATENT DOCUMENTS

| | | | |
|---|---|---|---|
| WO | 2018/163042 | A1 | 9/2018 |
| WO | 2018/163184 | A1 | 9/2018 |

*Primary Examiner* — Sean Shechtman
(74) *Attorney, Agent, or Firm* — Michael Dryja

(57) ABSTRACT

Examples of design element placement on 3D surfaces are described herein. In some examples, a three-dimensional (3D) mesh of a 3D surface is converted to a two-dimensional (2D) surface. In some examples, placement of design elements on the 2D surface is determined to maximize density of the design elements while satisfying a minimum separation distance between the design elements. In some examples, the design element placement on the 2D surface is converted to the 3D surface.

15 Claims, 8 Drawing Sheets

ELEMENT PLACEMENT ON 3D SURFACES

BACKGROUND

Electronic technology has advanced to become virtually ubiquitous in society and has been used to improve many activities in society. For example, computing devices are used to perform a variety of tasks, including work activities, communication, research, and entertainment. Different varieties of electronic circuits may be utilized to provide different varieties of electronic technology.

BRIEF DESCRIPTION OF THE DRAWINGS

Various examples will be described below by referring to the following figures.

Figure 1:
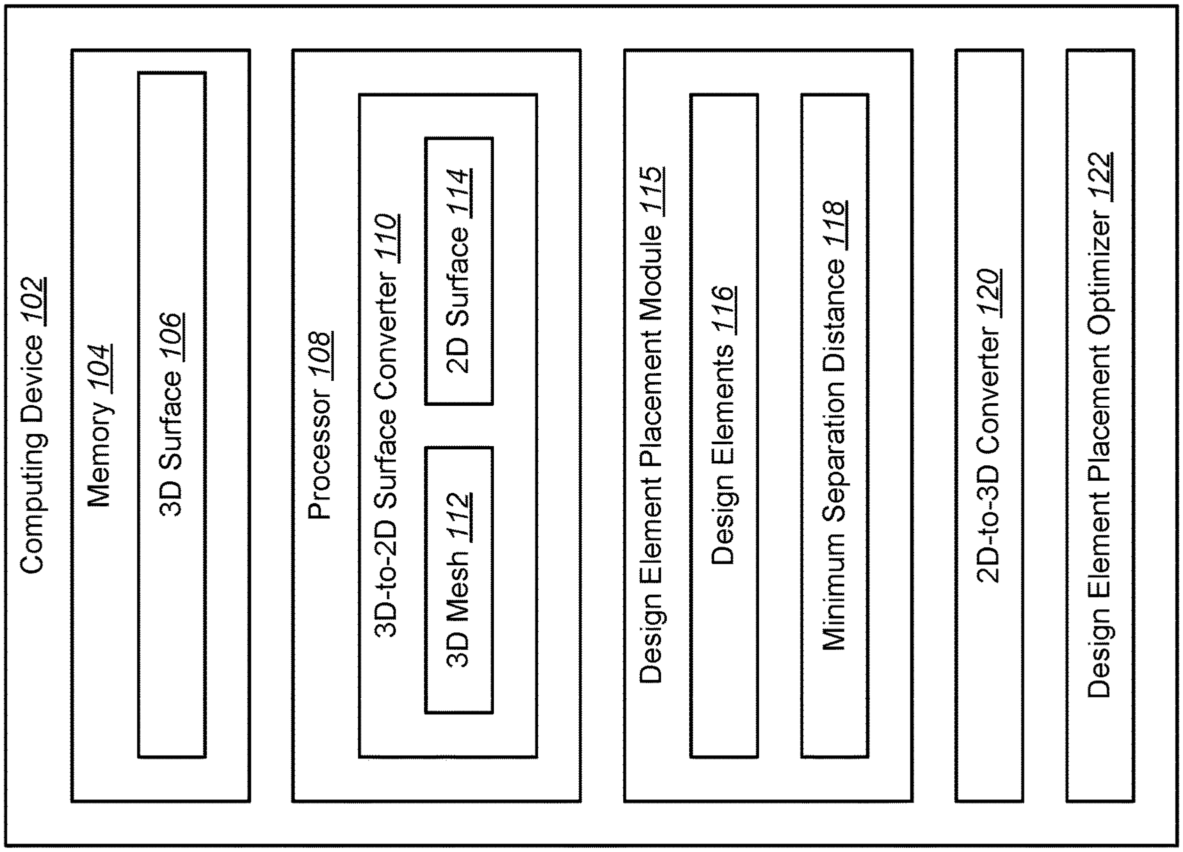
FIG. 1 is a block diagram illustrating an example of a computing device for design element placement on 3D surfaces.

Throughout the drawings, identical or similar reference numbers may designate similar, but not necessarily identical, elements. The figures are not necessarily to scale, and the size of some parts may be exaggerated to more clearly illustrate the example shown. Moreover, the drawings provide examples in accordance with the description; however, the description is not limited to the examples provided in the drawings.

DETAILED DESCRIPTION

A computing device may be a device that includes electronic circuitry. For instance, a computing device may include integrated circuitry (e.g., transistors, digital logic, semiconductor technology, etc.). Examples of computing devices include servers, laptop computers, desktop computers, smartphones, tablet devices, wireless communication devices, game consoles, game controllers, smart appliances, printing devices, vehicles with electronic components, aircraft, drones, robots, smart appliances, etc.

In some examples, a computing device may perform computing operations for additive manufacturing. As used herein, additive manufacturing refers to the production of three-dimensional (3D) solid parts from a digital model. As used herein, a computer-aided design (CAD) model is a digital model used to produce a 3D solid part. In some examples, additive manufacturing may be used in rapid prototyping, mold generation, mold master generation, and short-run manufacturing. Additive manufacturing involves the application of successive layers of build material. This is unlike other machining processes that often remove material to create the final part. In some additive manufacturing techniques, the build material may be cured or fused. Three-dimensional (3D) printing is an example of additive manufacturing. Some examples of 3D printing may include powder-based processes, such as selective laser sintering (SLS), binder jetting, and multi jet fusion (MJF).

In some examples, additive manufacturing may be used to create tooling (e.g., molds) for molded fiber, also called paper pulp. Molded fiber may be used for a packaging material in many applications, such as egg cartons, beverage carriers, medical waste disposal items, and protective product packaging. Molded fiber can be produced from recycled paper, corrugated boxes, plant fibers, etc., which makes it environmentally friendly and sustainable. The use of molded fiber packaging is rapidly growing. It should be noted that while the example of molded fiber tooling is described, the examples described herein may be used for other applications.

Additive manufacturing provides approaches for producing molded fiber tooling that may save time, reduce costs, and deliver a high-quality finished product. The additive manufacturing process builds parts (e.g., a tool) layer by layer. In some examples, a tool made by additive manufacturing can be produced to be both porous and rigid. For example, the outer boundary of a mold for molded fiber (referred to herein as a fiber mold) may be designed with a solid structure, the screen with porosity between layers, and the back of the fiber mold may be a rigid mesh structure to accommodate the vacuum draw during molded fiber production. Additive manufacturing may eliminate the need for machining the contour, drilling holes for vacuum pull and attaching the screen to the fiber mold. The entire additive manufacturing tool may be porous, which spreads the vacuum suction and produces a cleaner package with a better surface finish.

To realize the capacity of the additive manufacturing process, an efficient design process may be employed. This design process may allow a user to quickly design a fiber mold from an input CAD model of the target part. One aspect for such a process is how to instantiate design elements. For example, a fiber mold may include many (e.g., thousands) of pores on the surface of the CAD model. The result of instantiation has great influence on the efficiency of the production of the molded fiber packaging and the quality of the finished products. The examples described herein provide a simple and effective approach for this task.

Examples for placing design elements (e.g., pores) over a 3D surface are described herein. The examples include a 3D-to-2D-to-3D approach. An input 3D surface may be mapped onto a 2D surface (e.g., a uv plane). The initial design element placement and placement optimization may then be performed on the 2D surface. The design element placement may be mapped back to 3D. A guided field may be created by taking into account the curvature features of the input 3D surface and the mapping stretching. The design element placement optimization may be approached as an optimization model that includes a spring model and a shape-smoothing module. The optimization model may be solved iteratively with explicit formulas. As a result, the described examples provide a computationally efficient solution to complicated 3D design element placement. In some examples, the design element placement may be used for design and fabrication of parts (e.g., fiber molds) using 3D printing.

FIG. 1 is a block diagram illustrating an example of a computing device 102 for design element placement on 3D surfaces 106. Examples of the computing device 102 may include additive manufacturing devices (e.g., powder-based 3D printers), servers, workstations, laptop computers, desktop computers, tablet devices, cellular phones, smartphones, wireless communication devices, gaming consoles, gaming controllers, smart appliances, printing devices, vehicles (e.g., automobiles) with electronic components, aircraft, drones, robots, smart appliances, etc.

In some examples, the computing device 102 may include a processor 108. The processor 108 may be any of a microcontroller (e.g., embedded controller), a central processing unit (CPU), a semiconductor-based microprocessor, graphics processing unit (GPU), field-programmable gate array (FPGA), an application-specific integrated circuit (ASIC), a circuit, a chipset, and/or other hardware device suitable for retrieval and execution of instructions stored in a memory 104. The processor 108 may fetch, decode, and/or execute instructions stored in memory 104. While a single processor 108 is shown in FIG. 1, in other examples, the processor 108 may include multiple processors (e.g., a CPU and a GPU).

The memory 104 of the computing device 102 may be any electronic, magnetic, optical, and/or other physical storage device that contains or stores electronic information (e.g., instructions and/or data). The memory 104 may be, for example, Random Access Memory (RAM), Electrically Erasable Programmable Read-Only Memory (EEPROM), Dynamic Random Access Memory (DRAM), Synchronous DRAM (SDRAM), magnetoresistive random-access memory (MRAM), phase change RAM (PCRAM), non-volatile random-access memory (NVRAM), memristor, flash memory, a storage device, and/or an optical disc, etc. In some examples, the memory 104 may be a non-transitory tangible computer-readable storage medium, where the term “non-transitory” does not encompass transitory propagating signals. The processor 108 may be in electronic communication with the memory 104. In some examples, a processor 108 and/or memory 104 of the computing device 102 may be combined with or separate from a processor (e.g., CPU) and/or memory of a host device.

In some examples, the computing device 102 may be used for additive manufacturing operations. For instance, the computing device 102 may be an additive manufacturing device (e.g., 3D printer). In other examples, the computing device 102 may be a computer (e.g., server, workstation, desktop computer, laptop computer, etc.) that is separate from an additive manufacturing device.

Additive manufacturing has become increasingly popular in recent years due to its ability to mass manufacture unique parts. In some examples, additive manufacturing may form 3D objects through different approaches, such as, solid-based printing, powder-based printing, and/or liquid-based printing. In powder-based 3D printing processes, both metal powder and plastic powder may be used to print parts. These powder-based 3D printing processes may include selective laser sintering (SLS), binder jetting, and/or multi jet fusion (MJF).

The placement of design elements 116 on a 3D surface 106 may be an aspect of additive manufacturing. In some examples, a design element 116 may include a repeated feature on the 3D surface 106 that is to be formed on the 3D surface 106 during additive manufacturing. For example, design elements 116 may include pores on the 3D surface 106. As used herein, a pore is an opening in the 3D surface 106. In some examples, the pore may have a cylindrical shape or other shape. In other examples, a design element 116 may include surface texture, ornamentation, physical properties, mechanical properties, lattice structure, etc. In some examples, aside from their locations, the design elements 116 may be consistent throughout the 3D surface 106. For example, the pores may have the same diameter or other dimensions.

An aspect for pore placement is that given a 3D surface 106 as the contour shape of the target fiber mold, a set of pore center points may be generated on a specified region of the mold surface. In some examples, a minimum separation distance (e.g., spatial separation criterion) for the design elements 116 (e.g., the pores) may be met, while maximizing the total number of design elements 116 (e.g., pore center points). In the case of pores, once the pore centers are identified, a pore may be instantiated at each of these locations.

In the case of a fiber mold, the outside of the fiber mold may have a higher pressure, and the inside of the fiber mold may have a lower pressure. Fluid may flow from the outside of the fiber mold to the inside. Thus, a 3D surface 106 of the input model (e.g., a CAD model) that corresponds to the shape of a part (e.g., fiber mold) may be considered. In the case of pores, the shape of the pore may be a circle. Thus design element placement may be approached as circle packing. The examples described herein accommodate other types of design elements 116. For example, different shapes of pores may be used to refine slurry flow. Therefore, design elements may include pores in the mold to facilitate dewatering during production of a molded fiber object.

In some examples, the memory 104 may store the 3D surface 106. In some examples, the 3D surface 106 may be a CAD model. For example, the CAD model may be for a part that is to be produced by additive manufacturing. In other examples, the 3D surface 106 obtained from a surface of the CAD model. For instance, the 3D surface 106 may be extracted from a more complex CAD model.

The examples described herein include a 3D-2D-3D approach to design element placement. A 3D mesh 112 of the 3D surface 106 may be mapped onto a 2D surface 114 (e.g., a 2D plane). An initial placement of design elements 116 may be performed on the 2D surface 114. The design element placement on the 2D surface 114 may be mapped back to the 3D surface 106 in 3D space. The design element placement may then be refined to account for distortion in the conversion from 2D-to-3D. These aspects will now be described in more detail.

In some examples, the processor 108 may implement a 3D-to-2D surface converter 110. In some examples, the 3D-to-2D surface converter 110 may convert a 3D mesh 112 of a 3D surface 106 to a 2D surface 114. This process may be referred to as parameterization. For example, parameterization may be used to map the 3D mesh 112 onto the 2D plane. This can convert the task of placing design elements 116 (e.g., pores) on a 3D surface 106 to a 2D packing process.

In some examples, the 3D mesh 112 may be generated from the 3D surface 106. In some examples, the 3D mesh 112 may be a triangular mesh. Therefore, converting the 3D mesh 112 of the 3D surface 106 to the 2D surface 114 may include transforming a 3D triangular mesh to a 2D triangular mesh. It should be noted that a triangular mesh in 3D is intrinsically a 2D manifold, where the vertices (also referred to as nodes) of the 3D mesh 112 may be the center points of the design elements 116. Thus it is of interest to map each point on the 3D mesh 112 to a point on a 2D plane. The 3D-to-2D surface converter 110 may map vertices of the 3D mesh 112 to the 2D surface 114. This mapping may be referred to as parameterization. More examples of parameterization are described in FIG. 2.

The processor 108 may also implement a design element placement module 115. In some examples, the design element placement module 115 may determine the placement of design elements 116 on the 2D surface to maximize the density of the design elements 116 while satisfying a minimum separation distance (MSD) 118 between the design elements 116.

In some examples, the density of the design elements 116 may be the number of design elements 116 placed in a given area. The density of the design elements 116 may be maximized without exceeding a limit on how close the design elements 116 can be to each other. For example, the strength of a part generated with the design elements 116 may be negatively impacted if the design elements 116 are too close to each other. For a fiber mold to have sufficient strength, any two pores may be restricted from being too close together.

The design element placement module 115 may determine a minimum separation distance (MSD) 118 for the design elements 116. The MSD 118 may be determined to ensure a minimum distance between any two design elements 116. For example, the centers of any two design elements 116 (e.g., pores) may be separated by the MSD 118 at a minimum. Some examples of determining the MSD 118 are described in FIG. 3. In the example of pores, the MSD 118 may ensure that sufficient material exists between the pores to provide strength to a mold for a molded fiber object.

The density of the points (e.g., center points) for the design elements 116 on the 2D surface 114 may be generated under the constraint of the MSD 118. In some examples, the design element placement module 115 may determine a grid for placing design elements 116 on the 2D surface 114. The design element grid may include a pattern of design elements 116 that maximizes density of the design elements 116 while satisfying the MSD 118 between the design elements 116.

In a plane, the highest packing density for circles may be achieved with a regular hexagonal layout. In other words, neighboring triads of points may form equilateral triangles. An example of this arrangement is described in FIG. 4. In some examples, the design element placement module 115 may start with a hexagonal pattern for the design element placement. The design element placement module 115 may iteratively refine the locations of vertices (e.g., the center points of the design elements 116).

It should be noted that other patterns may be used for the design element placement. For example, 5-dice patterns may be used to generate the initial design element placement.

In some examples, the design element placement module 115 may overlay the design element grid on the 2D surface 114. For example, the design element placement module 115 may overlay the design element grid on the 2D triangular mesh of the model (i.e., the 2D surface 114) generated by the parameterization. In some examples, the design element grid may be positioned (e.g., moved) on the 2D surface 114 by translation and/or rotation.

In some examples, the design element placement module 115 may trim the design element grid at a boundary of the 2D surface 114. For example, once a user is satisfied with the location and orientation of the design element grid with respect to the 2D triangular mesh of the 2D surface 114, the design element grid may be trimmed by the boundary of the 2D triangular mesh. In some examples, the trimmed design element grid may be represented as a triangular mesh. As used herein, the trimmed design element grid may be referred to as a 2D triangular mesh for circles.

In some examples, the processor 108 may implement a 2D-to-3D converter 120. In some examples, the 2D-to-3D converter 120 may convert the design element placement on the 2D surface 114 to the 3D surface 106. For example, the 2D-to-3D converter 120 may convert the design element grid from the 2D surface 114 to the 3D surface 114.

In some examples, the 2D-to-3D converter 120 may map the design element grid from the 2D surface 114 to the 3D surface 106. For example, using inverse mapping, the 2D-to-3D converter 120 may map the 2D triangular mesh for circles back to 3D space and obtain a 3D triangular mesh for the design elements 116.

In some examples, the processor 108 may implement a design element placement optimizer 122 to refine the design element placement on the 3D surface 106 to account for distortion from the conversion from the 2D surface 114 to the 3D surface 106. As used herein, the term "refine" may mean improve to meet constraints. It should be noted that even if the initial design element placement meets constraints in 2D space, the design element placement may not meet constraints when it is mapped back to the 3D surface 106. This may be due to the mapping between 2D and 3D is not being isometric.

To achieve a distribution of design elements 116 (e.g., pores) that meet constraints (e.g., maximizing density of the design elements 116 while satisfying a minimum separation distance 118 between the design elements 116) on the 3D surface 106, the design element placement optimizer 122 may refine the design element placement either in 2D or in 3D to improve the design element placement in 3D. In some examples, the geometric properties of the shape of the 3D surface 106 and the distortion of the 3D to 2D mapping may be analyzed. The refinement of the design element placement may be guided by this analysis.

In some examples, the design element placement optimizer 122 may determine the curvature of the 3D surface 106. The design element placement optimizer 122 may then adjust a separation distance of the design elements 116 on the 3D surface 106 based on the curvature.

In some examples, the design element placement optimizer 122 may associate each point on the UV plane (i.e., the 2D surface 114) with a mean curvature. The design element placement optimizer 122 may then create a curvature field. The mean curvature may be used to adjust the separation distance. The larger the mean curvature is, the looser the distribution of design elements 116 may be. Examples of the curvature analysis are described in FIG. 5.

In some examples, the design element placement optimizer 122 may perturb (e.g., displace, adjust) the design element placement on the 3D surface 106 based on a spring model between design elements 116 to bring the design elements 116 toward each other on the 3D surface 106. For example, the geometric adjustment may include perturbing the location of all points in the design element grid so that their corresponding design elements 116 in 3D space have a better distribution on the input 3D surface 106.

In some examples, to perturb a given point, a spring model may be used, where each point is considered as a particle and each edge is considered as a spring. Some examples of the spring model are described in FIG. 6 and FIG. 7.

To perturb the 2D triangular mesh towards a better shape, a virtual force may be applied to the spring model. In some examples, the virtual force may be applied to the spring model to regulate distribution of the design elements 116 on the 2D surface 114. Thus, the spring forces tend to pull the design elements 116 towards each other in 3D space under the constraint of the MSD 118, hence increasing the density of the design elements 116. The effect of the virtual forces is to make the distribution of design elements 116 in 2D as regular as possible. The effects of the spring forces and the virtual force may be balanced.

Upon determining the design element placement on the 3D surface 106, the 3D surface 106 with the design elements 116 may be printed using a 3D printer. For example, a CAD file of the 3D surface 106 with the design elements 116 may be provided to a 3D printer to print the 3D surface 106.

In some examples, the 3D surface 106 may be a mold for a molded fiber object and the design elements 116 may be pores in the mold to facilitate dewatering during production of the molded fiber object. Therefore, the 3D printer may print the mold with pore placement determined as described above. Upon being printed, the mold may be used for dewatering during production of a molded fiber object. For example, a vacuum may be applied to the mold to force water through the pores.

The design element placement described herein provides a framework for placing design elements 116 (e.g., pores) on a 3D surface 106. Some aspects of the design element placement include 3D-to-2D mapping, initial design element placement in 2D, and 2D adjustment of the design element placement to refine 3D design element placement. These examples provide a computationally efficient approach using a 3D-2D-3D approach. These examples also allow for optimizing the design element placement based on curvature features of the input 3D surface and the stretching caused by the mapping. In some examples, various patterns of design element distribution may be employed. Furthermore, these examples may provide the ability to control the distribution of design elements 116 in terms of regularity.

Figure 2:
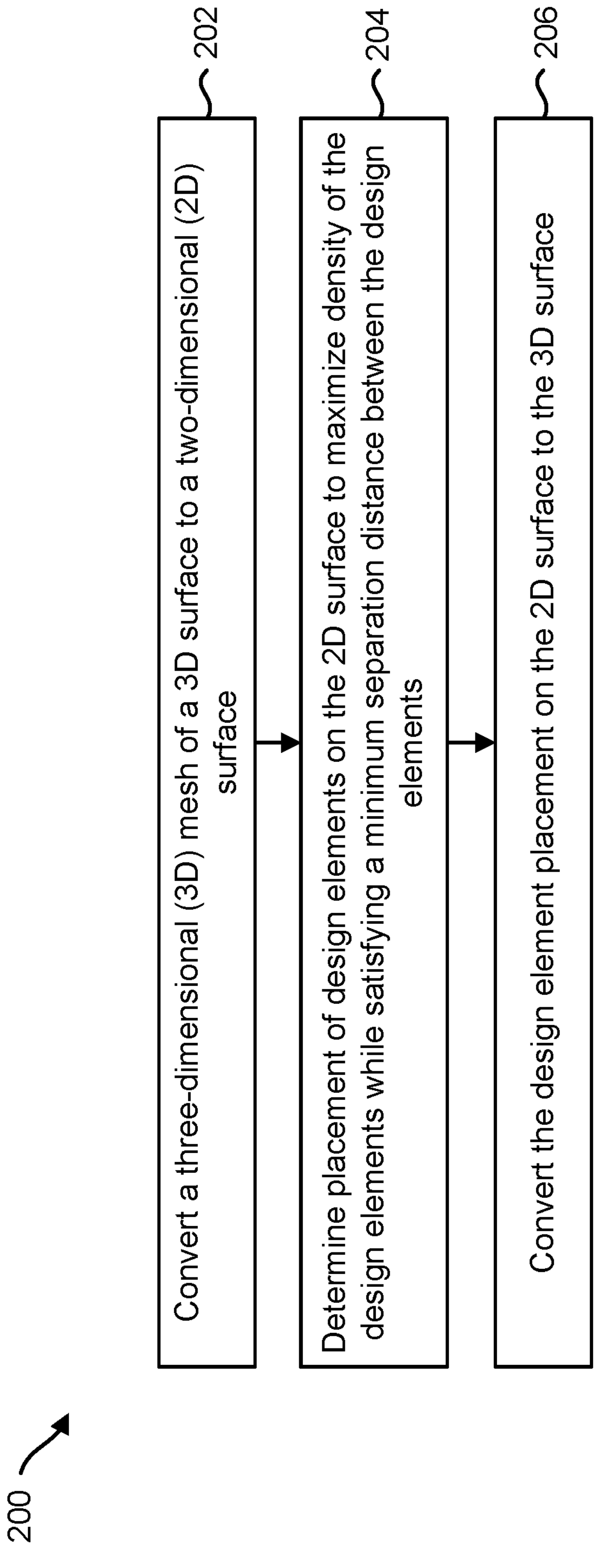
FIG. 2 is a flow diagram illustrating an example of a method for design element placement.

FIG. 2 is a flow diagram illustrating an example of a method 200 for design element placement. The method 200 and/or an element or elements of the method 200 may be performed by a computing device. For example, an element or elements of the method 200 may be performed by the computing device 102 described in FIG. 1 and/or the processor 108 described in FIG. 1 any of which may be referred to generally as a "computing device" in FIG. 2.

At 202, the computing device may convert a three-dimensional (3D) mesh of a 3D surface to a two-dimensional (2D) surface. For example, the computing device may transform a 3D triangular mesh to a 2D triangular mesh. The computing device may map vertices of the 3D mesh to the 2D surface.

In some examples, the design elements may be pores in the 3D surface. A 3D mesh may be implemented as a triangular mesh that is labeled for pore placement. For instance, let $M=\{V,F\}$ be the triangular mesh, where V is the list of vertices $V_i$, and $F=\{F_{ijk}|F_{ijk}=\Delta V_i V_j V_k, V_i, V_j, V_k \in V, i\neq j, j\neq k, k\neq i\}$ is the list of triangles encoding how the vertices are connected. Edge information may be inferred from the list of faces. The list of edges may be denoted by $E=\{E_{ij}|V_i V_j, V_i, V_j \in V, i\neq j\}$. Given the mesh M and the specification of values of a few global parameters for the geometry of pores, such as the radius of the sphere and the minimum separation distance, a goal of the examples described herein is to compute a set of pore center coordinates on the mesh, which have good spatial distribution and high density.

As described above, a triangular mesh in 3D is intrinsically a 2D manifold, where the center points of the design elements may lie. Thus, each point on the 3D mesh may be mapped to a point on a 2D plane.

In some examples, the computing device may implement a parameterization approach that preserves the geodesic distance as much as possible. In some examples, a deformation method called as-rigid-as-possible (ARAP) may be used to parameterize the 3D mesh. A result of ARAP deformation is to keep the transformation for the surface in each cell as rigid as possible. The ARAP deformation may apply to a manifold that is homeomorphic to the 2D planar domain. If a triangular mesh is not homeomorphic to a planar domain, a partition process may be used to divide the 3D mesh into segments and then the ARAP deformation applies to each segment. Without loss of generality, it may be assumed that the triangular mesh is homeomorphic to a planar domain.

In some examples, through ARAP parameterization, a 2D triangular mesh $M=\{V,F\}$ may be obtained on the plane, where V is the list of vertices $v_i$ on the plane, and $F=\{f_{ijk}|f_{ijk}=\Delta v_i v_j v_k, v_i, v_j, v_k \in V, i\neq j, j\neq k, k\neq i\}$ is the list of triangles. Similarly, the list of edges may be denoted by $E=\{e_{ij}|e_{ij}=v_i v_j, v_i, v_j \in V, i\neq j\}$.

The parameterization may induce a bijective map $F:M\subset R^3\rightarrow M\subset R^2$. For each vertex $V_{ijk}\in V$, there is $$F(V_i)=v_i\in V, F^{-1}(v_i)=V_i \quad (1)$$

Using the barycentric coordinates, the map F may be extended to be a piecewise linear function that can apply to any point on the meshes. That is, for any point V that may lie on triangle $F_{ijk}$ there are three numbers $w_i$, $w_j$ and $w_k$ with $w_i+w_j+w_k=1$ such that $V=w_iV_i+w_jV_j+w_kV_k$. The triple $(w_i, w_j, w_k)$ is called the barycentric coordinates of V with respect to $F_{ijk}$. Thus, $$F(V)=w_iv_i+w_jv_j+w_kv_k. \quad (2)$$

Similarly, for any point $v=w_iv_i+w_jv_j+w_kv_k\in f_{ijk}$, there is $$F^{-1}(v)=w_iV_i+w_jV_j+w_kV_k. \quad (3)$$

Equation (2) may be used to map a point on the 3D surface to the 2D surface. Equation (3) may be used to inverse map a point on the 2D surface back to the 3D surface.

At 204, the computing device may determine the placement of design elements on the 2D surface to maximize density of the design elements while satisfying a minimum separation distance between the design elements. In some examples, the distance between the centers $V_i=(x_i, y_i, z_i)$ and $V_j=(x_j, y_j, z_j)$ of the two circles in 3D Euclidean space should satisfy:

$$\sqrt{(x_i-x_j)^2+(y_i-y_j)^2+(z_i-z_j)^2}\geq MSD. \quad (4)$$

The computing device may maximize the density of generated points on the 2D surface under the constraint of the MSD (e.g., as defined by Equation (4)). Some examples for the design element placement are described in FIG. 3.

At 206, the computing device may convert the design element placement on the 2D surface to the 3D surface. In some examples, the computing device may use to inverse mapping of Equation (3) to convert the placement of the design elements from the 2D surface to the 3D surface.

In some examples, the method 200 may include printing the 3D surface with the design elements using a 3D printer. In some examples, the 3D surface may be a mold for a molded fiber object and the design elements may include pores in the mold to facilitate dewatering during production of the molded fiber object.

In some examples, the method 200 may further include using the mold for dewatering during production of the molded fiber object. For example, a slurry of fiber and liquid (e.g., water) may be applied to a front surface of the mold.

A vacuum may be applied to a back surface of the mold to facilitate movement of the liquid through the pores.

Figure 3:
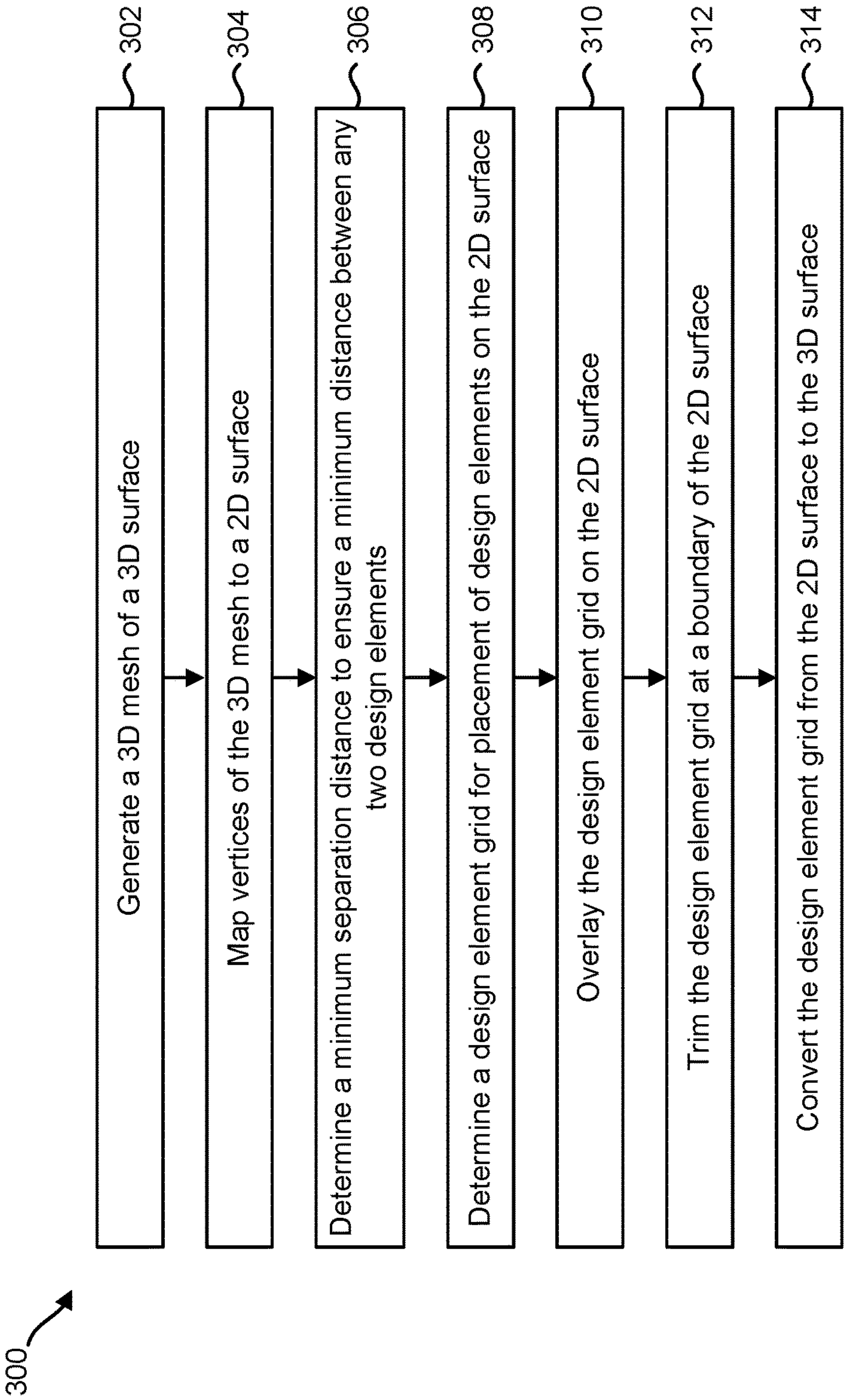
FIG. 3 is a flow diagram illustrating another example of a method for design element placement.

FIG. 3 is a flow diagram illustrating another example of a method 300 for design element placement. The method 300 and/or an element or elements of the method 300 may be performed by a computing device. For example, an element or elements of the method 300 may be performed by the computing device 102 described in FIG. 1 and/or the processor 108 described in FIG. 1 any of which may be referred to generally as a "computing device" in FIG. 3.

At 302, the computing device may generate a 3D mesh of a 3D surface. For example, the computing device may receive a CAD file that includes a 3D surface. The computing device may generate a 3D mesh of the 3D surface that includes a number of vertices. In some examples, the 3D mesh may be a 3D triangular mesh.

At 304, the computing device may map vertices of the 3D mesh to a 2D surface. For example, this may be accomplished according to Equation (2).

At 306, the computing device may determine a minimum separation distance (MSD) to ensure a minimum distance between any two design elements. In some examples, the MSD may be determined according to Equation (4).

At 308, the computing device may determine a design element grid for placement of design elements on the 2D surface. In some examples, the design element grid may be a hexagonal grid.

In some examples, the design element placement may include determining a stretching factor. For each edge $E_{ij} \in E$ in 3D space, there is a corresponding edge $e_{ij} \in E$ in a 2D plane. The stretching factor $s_{ij} = \|E_{ij}\| / \|e_{ij}\|$ may be computed. The computing device may select the smallest stretching factor $$s = \min_{e_{ij}}\{s_{ij}\}$$

among all edges.

From the input MSD value, the diameter of circles in the 2D plane may be computed. In some cases, the diameter of a circle may be MSD/s. It should be noted that considering the constraint of Equation (4) in 3D, the diameter may be conservatively estimated by using the smallest stretching factor. In some examples, the computing device may generate a design element grid with a regular hexagon layout using the diameter value of the circles. An example of the hexagonal pattern for a design element grid is described in FIG. 4.

At 310, the computing device may overlay the design element grid on the 2D surface. For example, the computing device may overlay the design element grid on the 2D triangular mesh of the model generated by the parameterization. The computing device may move the whole design element grid by translation and/or rotation to refine placement of the design elements on the 2D surface.

At 312, the computing device may trim the design element grid at a boundary of the 2D surface. For example, once a user is satisfied with the location and orientation of the design element grid with respect to the 2D triangular mesh of the model, the design element grid may be trimmed by the boundary of the 2D triangular mesh. The trimmed design element grid may be represented as a triangular mesh. In the case of circular pores, the trimmed design element grid may be referred to as the 2D triangular mesh for circles.

At 314, the computing device may convert the design element grid from the 2D surface to the 3D surface. For example, using inverse mapping (e.g., Equation (3)), the computing device may map the 2D triangular mesh of the design element grid back to 3D space. In the case of circular pores, the inverse mapped design element grid may be referred to as a 3D triangular mesh for pores.

Figure 4:
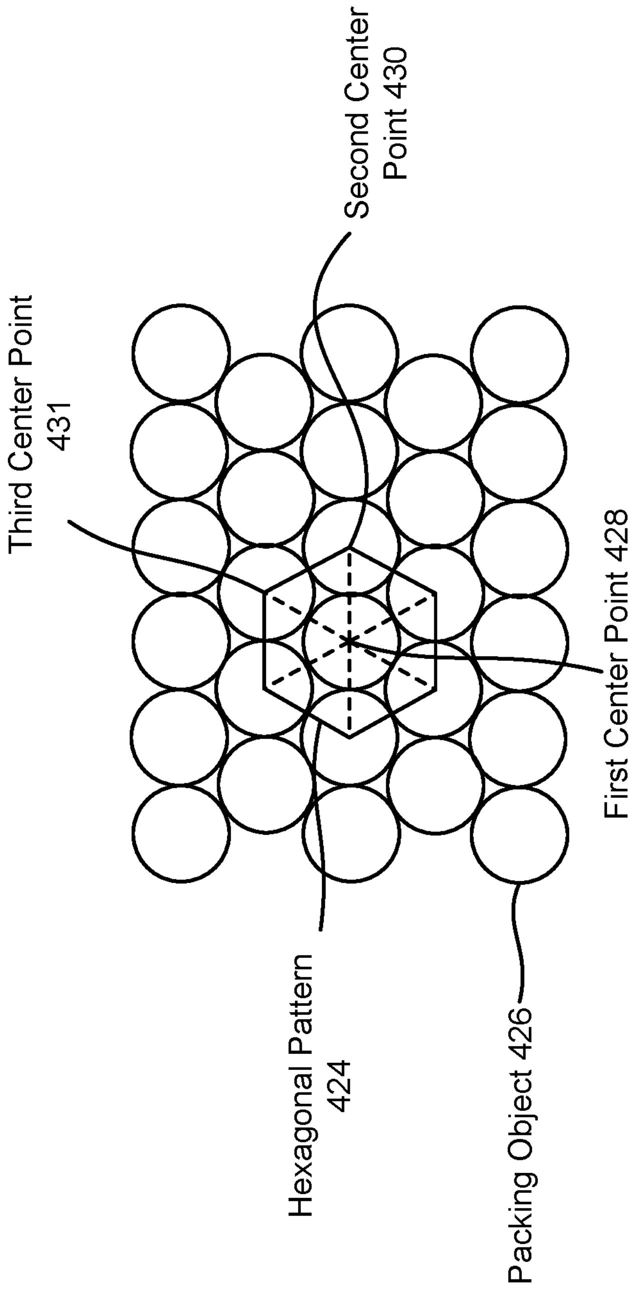
FIG. 4 is an example of a hexagonal pattern for a design element grid.

FIG. 4 is an example of a hexagonal pattern 424 for a design element grid. In this example, a number of packing objects 426 are arranged in a hexagonal pattern 424.

In some examples, the size (e.g., diameter) of the packing objects 426 may be determined based on the MSD and the stretching factor s. In some examples, the MSD may be determined according to Equation (4). In other examples, the MSD may be determined to ensure a minimum amount of space between any two design elements. The hexagonal pattern 424 may give the densest packing of packing objects 426.

In this example, the distance between any two packing objects 426 in the hexagonal pattern 424 may be equivalent. For example, the distance between a first center point 428 and a second center point 430 may be the same as the distance between the first center point 428 and a third center point 431, and so forth.

Figure 5:
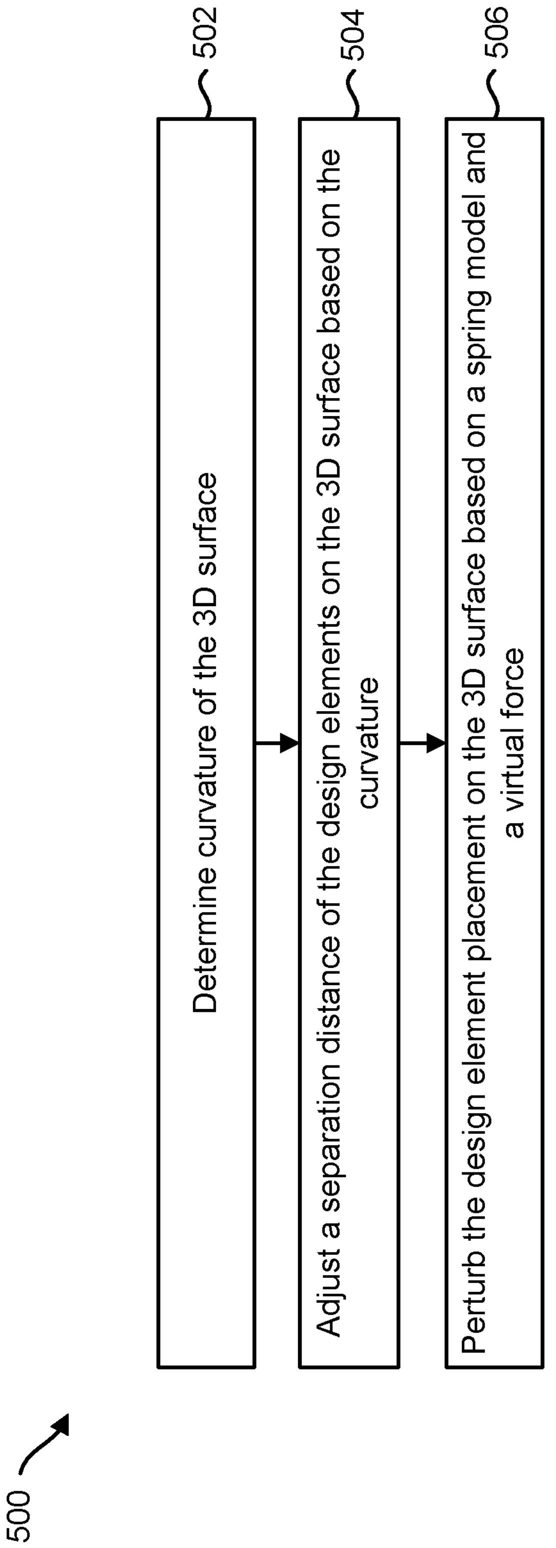
FIG. 5 is a flow diagram illustrating another example of a method for design element placement.

FIG. 5 is a flow diagram illustrating an example of a method 500 for design element placement. The method 500 and/or an element or elements of the method 500 may be performed by a computing device. For example, an element or elements of the method 500 may be performed by the computing device 102 described in FIG. 1 and/or the processor 108 described in FIG. 1 any of which may be referred to generally as a "computing device" in FIG. 5.

In some examples, the computing device may determine design element placement on a 2D surface. This may be accomplished as described in FIG. 3. As described above, the design element placement in 2D may be distorted when mapped to 3D. To address the 2D-to-3D distortion, the computing device may refine the design element placement for the 3D surface.

At 502, the computing device may determine curvature of the 3D surface. In some examples, the 2D triangular mesh for circles may be donated by {P,T}, where P is the list of vertices $p_i$ on the plane (e.g., the 2D surface), and $T=\{t_{ijk} | t_{ijk}=\Delta p_i p_j p_k,\ p_i,\ p_j,\ p_k \in P,\ i \neq j,\ j \neq k,\ k \neq i\}$ is the list of triangles. In some examples, geometric adjustment may be used to perturb (e.g., disturb or displace) the location of all $p_i$ so that their corresponding design elements (e.g., pores) in 3D space have a better distribution on the input 3D mesh surface. In some examples, each $p_i$ may be perturbed iteratively. An objective is to find appropriate values for the increments $(\Delta u_i, \Delta v_i)$. This may be accomplished with the following techniques.

The computing device may perform a curvature analysis. For a point in the UV plane (e.g., the 2D surface), the curvature of its corresponding point on the input mesh surface may be found. For example, a point v may lie on the triangle $f_{ijk}$. The barycentric coordinates $(w_i, w_j, w_k)$ may be found such that $V=w_i v_i + w_j v_j + w_k v_k \in f_{ijk}$. Therefore, by inverse mapping, $F(V)=w_i v_i + w_j v_j + w_k v_k$.

The discrete mean curvature of the mesh surface may be computed at $V_i$ as follows:

$$\kappa(V_i) = \sum_{h=1}^{n} \frac{\cot\alpha_h + \cot\beta_h}{2}(V_i - V_h), \tag{5}$$

where the vertices adjacent to $V_i$ are $V_1, V_2, \ldots, V_n$, and $\alpha_h$, $\beta_h$ are the angles opposite edge $V_iV_h$ in the two incident triangles. Similarly, $\kappa(V_j)$ and $\kappa(V_k)$ may be computed. Thus, $\kappa(F^{-1}(v))=w_i\kappa(V_i)+w_j\kappa(V_j)+w_k\kappa(V_k)$.

In this manner, each point on the UV plane may be associated with a mean curvature. A curvature field may be created from the mean curvature of the points.

At 504, the computing device may adjust a separation distance of the design elements on the 3D surface based on the curvature. In some examples, the mean curvature can be used to adjust the separation distance. The larger the mean curvature is, the looser the distribution of design elements (e.g., pores) may be.

In some examples, the range of the curvature distribution over the whole mesh surface may be computed. For example, the range may be $[\kappa_{min},\kappa_{max}]$. Then, a further apart distance may be defined for edge $p_ip_j$ to be $$fMSD(p_ip_j) = c\left(\frac{\max\left(\kappa\left(F^{-1}(p_i)\right)-\kappa_{min},\ \kappa\left(F^{-1}(p_j)\right)-\kappa_{min}\right)}{\kappa_{max}-\kappa_{min}}\right)^m MSD, \tag{6}$$

where c and m are global constants. The value of $fMSD(p_i, p_j)$ may be used to add to the original MSD to adjust the separation distance.

In some examples, the computing device may determine a stretching factor. For each edge $p_ip_j$ on the UV plane (e.g., the 2D surface), a corresponding edge $V_iV_j$ may be found by the inverse mapping (e.g., according to Equation (3)). The stretching factor of the edge $p_ip_j$ may be defined to be $$s_{ij}=\|V_i-V_j\|/\|p_i-p_j\|. \tag{7}$$

At 506, the computing device may perturb the design element placement on the 3D surface based on a spring model and a virtual force. To perturb point $p_i$, a spring model may be used where each point is considered as a particle and each edge is considered as a spring. Let N(i) denote the set of indices of the vertices adjacent to $p_i$ in the 2D triangular mesh for circles. For each edge $P_{ij}$, $j\in N(i)$, the spring constant may be 1 and the spring rest length $l_{ij}$ is the target length, i.e., $$l_{ij} = \frac{fMSD(p_ip_j)+MSD}{s_{ij}}.$$

Figure 7:
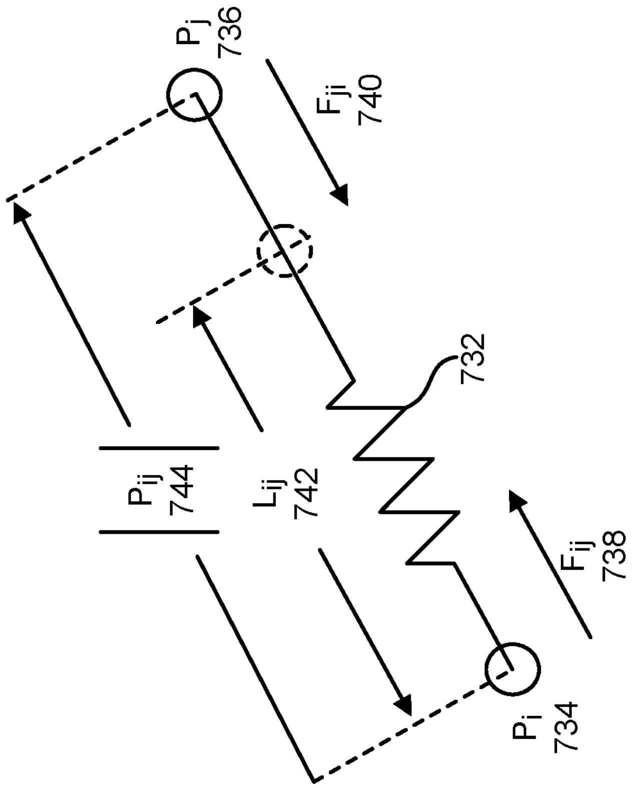
FIG. 7 is an example of a spring force model for optimizing design element placement.
Figure 6:
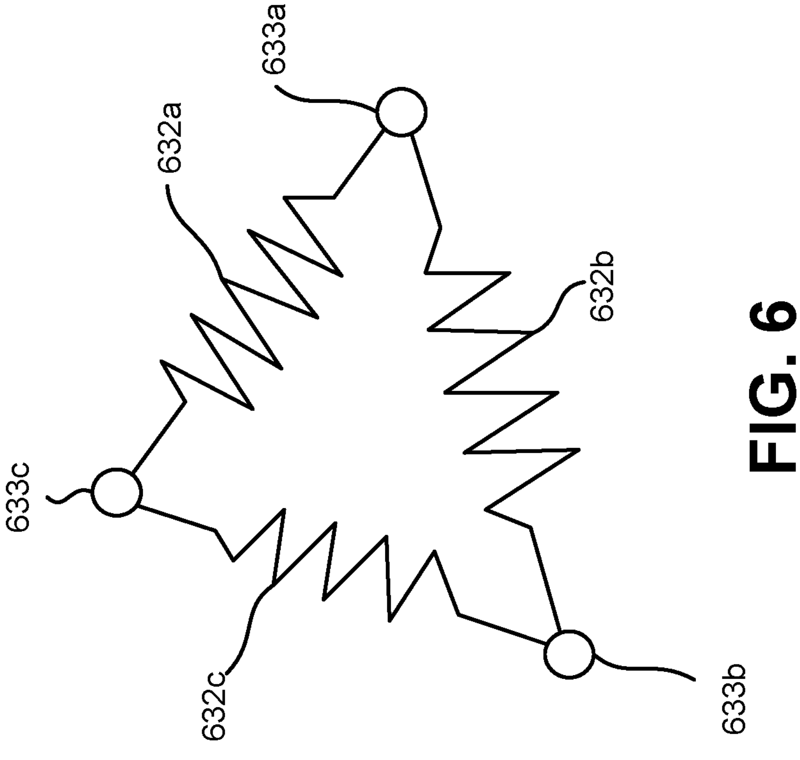
FIG. 6 is an example of a spring net model for optimizing design element placement.

The restoring force on particle $p_i$ due to particle $p_j$ is proportional to the stretch of the spring beyond its rest length $l_{ij}$:

$$F_{ij} = (\|p_{ij}\|-l_{ij})\frac{p_{ij}}{\|p_{ij}\|}, \tag{8}$$

where $p_{ij}=p_j-p_i$. FIG. 6 and FIG. 7 illustrate an example of the spring model. The sum of the restoring forces due to the neighboring particles may be determined as $$\sum_{j\in N(i)} F_{ij} = \sum_{j\in N(i)} (\|p_{ij}\|-l_{ij})\frac{p_{ij}}{\|p_{ij}\|} \tag{9}$$

To perturb the 2D triangular mesh towards a better (e.g., more uniform) shape, a virtual force may be introduced that pulls the particle $p_i$ towards the centroid of the local configuration of $p_i$. The virtual force simulates gravitational force.

In some examples, if $p_i$ is an interior point, then the centroid may be defined by $$Ctr(p_i) = \sum_{j\in N(i)} \frac{p_j}{l_{ij}} \Big/ \sum_{j\in N(i)} \frac{1}{l_{ij}}. \tag{10}$$

It should be noted that if all $l_{ij}$ are the same, then $Ctr(p_i)$ may be the average of the neighboring points.

If $p_i$ lies on the boundary, then its two neighboring points on the boundary may be denoted by $p_{i-1}$ and $p_{i+1}$. In this case, the centroid may be set as $$Ctr(p_i) = \frac{1}{6}p_{i-1} + \frac{2}{3}p_i + \frac{1}{6}p_{i+1} \tag{11}$$

which is the result of applying a smoothing filter.

The virtual force applied on the particle $p_i$ is $Ctr(p_i)-p_i$. Then the overall force may be defined as the combination of the spring forces and the virtual force:

$$F(p_i) = \sum_{j\in N(i)} (\|p_{ij}\|-l_{ij})\frac{p_{ij}}{\|p_{ij}\|} + \lambda(Ctr(p_i)-p_i) \tag{12}$$

where $\lambda$ is a tradeoff parameter balancing the two terms.

It should be noted that in the above formulation, if $(\Delta u_i,\Delta v_i)$ is chosen to be $$(\|p_{ij}\|-l_{ij})\frac{p_{ij}}{\|p_{ij}\|},$$

then it will make the spring corresponding to edge $p_ip_j$ be in a rest state. Similarly, letting $(\Delta u_i,\Delta v_i)$ equal $Ctr(p_i)-p_i$ makes $p_i$ be located in an ideal position. Based on these considerations, $(\Delta u_i,\Delta v_i)$ may be chosen as $$(\Delta u_i, \Delta v_i) = \frac{\sum_{j\in N(i)} (\|p_{ij}\|-l_{ij})\frac{p_{ij}}{\|p_{ij}\|} + \lambda(Ctr(p_i)-p_i)}{Val(i)+\lambda} \tag{13}$$

where Val(i) is the valence of $p_i$. Then, $p_i$ may be updated as follows:

$$p_i=p_i+t(\Delta u_i,\Delta v_i)$$

where t is a global scalar chosen to ensure that there is no fold-over face.

Some examples for choosing t are now described. In some examples, a 2D cross-product may take two 2D vectors and outputs a scalar. For example, given two vectors $V_1=(a_1,b_1)$ and $V_2=(a_2,b_2)$, its 2D cross-product is $$V_1\otimes V_2=a_1b_2-a_2b_1.$$

In some examples, a triangle may have vertices $P_1=(u_1, v_1)$, $P_2=(u_2,v_2)$ and $P_3=(u_3,v_3)$ on the UV-plane. To determine whether the vertices are placed clockwise or counter-clockwise, the 2D cross-product may be computed for vectors $(P_2-P_1)$ and $(P_3-P_1)$:

$$(P_2-P_1)\otimes(P_3-P_1)=(u_2-u_1)(u_3-u_1)-(u_3-u_1)(u_2-u_1).$$

If the cross-product is positive, then the orientation is counter-clockwise and 1 value may be assigned to a variable $\xi$ to indicate this orientation. Otherwise, a −1 value may be assigned to $\xi$ The orientation of the perturbed triangle $P'_1$, $P'_2$ and $P'_3$ can be similarly computed by the 2D cross-product:

$$(P_2' - P_1') \otimes (P_3' - P_1') = (P_2 + t\Delta P_2 - P_1 - t\Delta P_1) \otimes (P_3 + t\Delta P_3 - P_1 - t\Delta P_1)$$

$$= (\Delta P_2 - \Delta P_1) \otimes (\Delta P_3 - \Delta P_1)t^2 + ((P_2 - P_1) \otimes (\Delta P_3 - \Delta P_1) + (\Delta P_2 - \Delta P_1) \otimes (P_3 - P_1))t + (P_2 - P_1) \otimes (P_3 - P_1)$$

The condition that triangle $P_1P_2P_3$ has no foldover is that the orientations of both triangles $P_1P_2P_3$ and $$P_1'P_2'P_3'$$

are the same. Thus, $$(P_2' - P_1') \otimes (P_3' - P_1')$$

may be multiplied by $\xi$, which gives the following quadratic polynomial:

$$f(t)=at^2+bt+c$$

where $a=((\Delta P_2-\Delta P_1)\otimes(\Delta P_3-\Delta P_1))\xi$ $b=((P_2-P_1)\otimes(\Delta P_3-\Delta P_1)+(\Delta P_2-\Delta P_1)\otimes(P_3-P_1)))\xi$ $c=((P_2-P_1)\otimes(P_3-P_1))\xi$ Thus, triangle $P_1P_2P_3$ has no foldover if $f(t)>0$. It should be noted that $c>0$ if the initial triangle $P_1P_2P_3$ does not degenerate. Thus, as long as t is sufficiently small, f(t) is positive. Such a t may be found within (0,1] by solving the quadratic equation.

In some examples, t may be computed for each triangle. The smallest value of t may be chosen among all of the computed values of t. This may ensure that the triangles are fold-over free.

FIG. 6 is an example of a spring net model for optimizing design element placement. In this example, the spring net includes points 633*a-c* and edges 632*a-c*. In the spring model described herein, the points 633*a-c* may be considered particles and the edges 632*a-c* may be considered springs.

FIG. 7 is an example of a spring force model for optimizing design element placement. In this example, a spring 732 is connected between particle $p_i$ 734 and particle $p_j$ 736. The spring 732 has a rest length $l_{ij}$ 742. The restoring force $F_{ij}$ 738 on particle $p_i$ 734 due to particle $p_j$ 736 is proportional to the stretch of the spring 732 beyond its rest length $l_{ij}$ 742. Therefore, $$F_{ij} = (\|p_{ij}\| - l_{ij})\frac{p_{ij}}{\|p_{ij}\|},$$

where $p_{ij}=p_j-p_i$. A corresponding restoring force $F_{ji}$ 740 on particle $p_j$ 736 due to particle $p_i$ 734 may be similarly determined.

Figure 8:
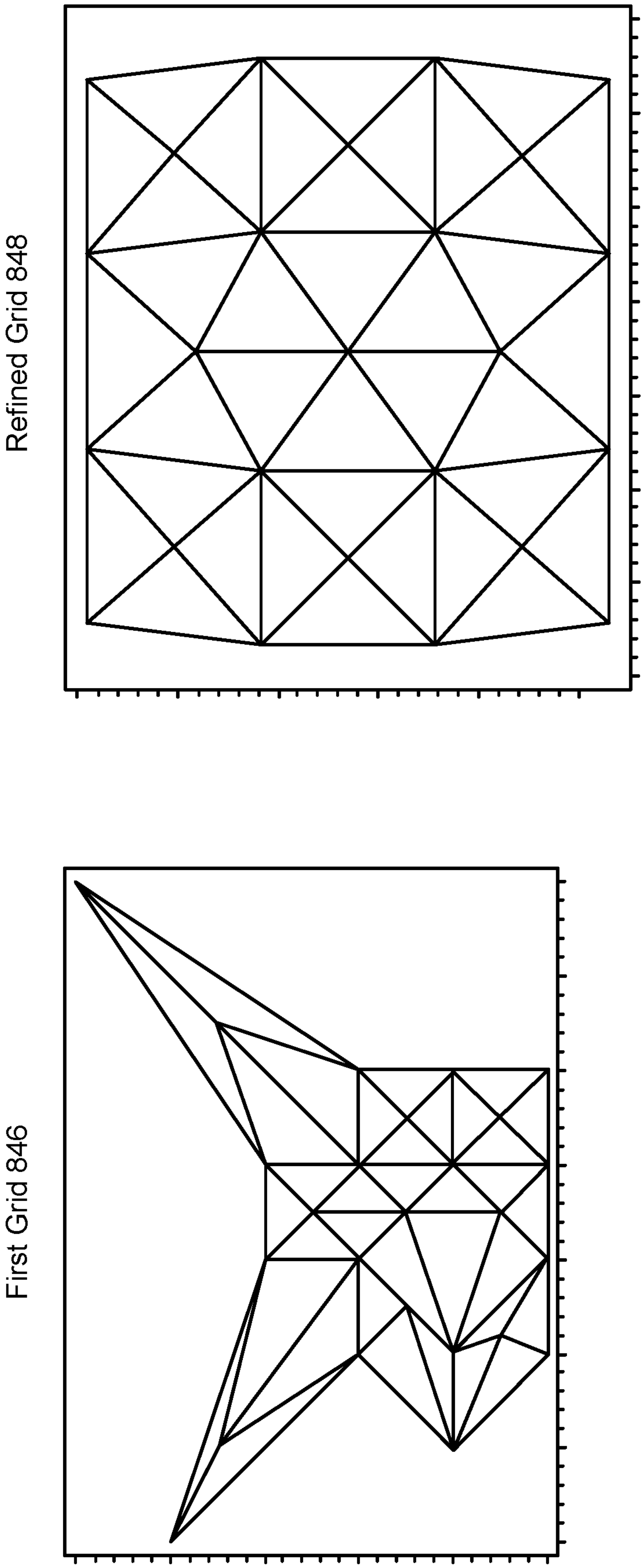
FIG. 8 illustrates examples of design element grids.

FIG. 8 illustrates examples of design element grids. A first grid 846 illustrates an example of an irregular 2D uv-grid for design elements. The examples described herein may be iteratively applied to the first grid 846. In an example, the target rest length $l_{ij}$ may be set to a uniform value. By performing multiple iterations, the refined grid 848 may be obtained, where each grid point serves as the center of a design element.

Figure 9:
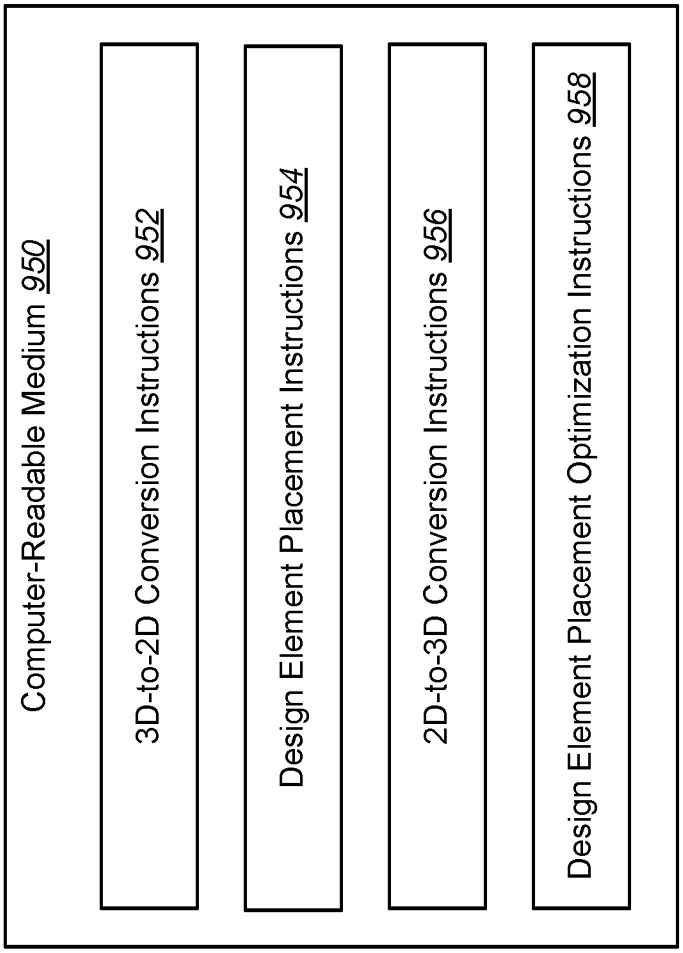
FIG. 9 is a block diagram illustrating an example of a computer-readable medium for design element placement on a 3D surface.

FIG. 9 is a block diagram illustrating an example of a computer-readable medium 950 for design element placement on a 3D surface. The computer-readable medium 950 may be a non-transitory, tangible computer-readable medium 950. The computer-readable medium 950 may be, for example, RAM, EEPROM, a storage device, an optical disc, and the like. In some examples, the computer-readable medium 950 may be volatile and/or non-volatile memory, such as DRAM, EEPROM, MRAM, PCRAM, memristor, flash memory, and the like. In some examples, the computer-readable medium 950 described in FIG. 9 may be an example of memory for a computing device described herein. In some examples, code (e.g., data and/or executable code or instructions) of the computer-readable medium 950 may be transferred and/or loaded to memory or memories of the computing device.

The computer-readable medium 950 may include code (e.g., data and/or executable code or instructions). For example, the computer-readable medium 950 may include 3D-to-2D conversion instructions 952, design element placement instructions 954, 2D-to-3D conversion instructions 956, and design element placement optimization instructions 958.

In some examples, the 3D-to-2D conversion instructions 952 may be instructions that when executed cause the processor of the computing device to convert a three-dimensional (3D) mesh of a 3D surface to a two-dimensional (2D) surface. For example, the processor may generate a 3D triangular mesh. The processor may map vertices of the 3D mesh to the 2D surface. In some examples, this may be accomplished as described in FIG. 1 and FIG. 2.

In some examples, the design element placement instructions 954 may be instructions that when executed cause the processor of the computing device to determine placement of design elements on the 2D surface to maximize density of the design elements while satisfying a minimum separation distance between the design elements. In some examples, this may be accomplished as described in FIG. 1 and FIG. 3.

In some examples, the 2D-to-3D conversion instructions 956 may be instructions that when executed cause the processor of the computing device to generate annotations to convert the design element placement on the 2D surface to the 3D surface. In some examples, this may be accomplished as described in FIG. 1.

In some examples, the design element placement optimization instructions 958 may be instructions that when executed cause the processor of the computing device to refine the design element placement on the 3D surface to account for distortion from the conversion from the 2D surface to the 3D surface. For example, the processor may determine the curvature of the 3D surface. The processor may adjust the separation distance of the design elements on the 3D surface based on the curvature. In some examples, the processor may perturb the design element placement on the 3D surface based on a spring model between design elements to bring the design elements toward each other on the 3D surface. The processor may further apply a virtual force to the spring model to regulate distribution of the design elements on the 2D surface. In some examples, this may be accomplished as described in FIG. 1 and FIGS. 5-7.

As used herein, the term "and/or" may mean an item or items. For example, the phrase "A, B, and/or C" may mean any of: A (without B and C), B (without A and C), C (without A and B), A and B (but not C), B and C (but not A), A and C (but not B), or all of A, B, and C.

While various examples are described herein, the disclosure is not limited to the examples. Variations of the examples described herein may be within the scope of the disclosure. For example, operations, functions, aspects, or elements of the examples described herein may be omitted or combined.

The invention claimed is:

1. A method comprising:

converting, by a processor, a three-dimensional (3D) mesh of a 3D surface to a two-dimensional (2D) surface that is planar, wherein
  the 3D surface is part of a 3D model of a mold to be printed using a 3D printer, and
  the mold is for a molded fiber object and used during production of the molded fiber object;

determining, by the processor, placement of design elements on the 2D surface to maximize density of the design elements while satisfying a minimum separation distance between the design elements, wherein
  the design elements correspond to pores to be added to the 3D model such that the mold is formed with the pores when printed using the 3D printer;

converting, by the processor, design element placement on the 2D surface to the 3D surface of the 3D model to add the pores to the 3D model; and printing, by the 3D printer, the mold using the 3D model to which the pores have been added, such that the mold is formed with the pores.

2. The method of claim 1, wherein converting the 3D mesh of the 3D surface to the 2D surface comprises transforming a 3D triangular mesh to a 2D triangular mesh.

3. The method of claim 1, wherein converting the 3D mesh of the 3D surface to the 2D surface comprises:

mapping vertices of the 3D mesh to the 2D surface.

4. The method of claim 1, further comprising:

determining, by the processor, the minimum separation distance to ensure a minimum distance between any two design elements.

5. The method of claim 1, wherein the pores in the mold facilitate dewatering during the production of the molded fiber object.

6. The method of claim 5, further comprising:

using the mold for dewatering during the production of the molded fiber object.

7. A computing device comprising:

a processor; and a memory storing instructions that when executed by the processor, cause the processor to:
  convert a three-dimensional (3D) mesh of a 3D surface to a two-dimensional (2D) surface that is planar, wherein
    the 3D surface is part of a 3D model of a mold to be printed using a 3D printer, and
    the mold is for a molded fiber object and used during production of the molded fiber object;
  determine a design element grid for placement of design elements on the 2D surface to maximize density of the design elements while satisfying a minimum separation distance between the design elements, wherein
    the design elements correspond to pores to be added to the 3D model such that the mold is formed with the pores when printed using the 3D printer;
  convert the design element grid from the 2D surface to the 3D surface to add the pores to the 3D model; and
  cause the 3D printer to print the mold using the 3D model to which the pores have been added, such that the mold is formed with the pores.

8. The computing device of claim 7, wherein the design element grid comprises a pattern of design elements.

9. The computing device of claim 8, wherein the pattern comprises a hexagonal pattern of design elements.

10. The computing device of claim 7, wherein the instructions, when execute by the processor, further cause the processor is to:

overlay the design element grid on the 2D surface; and trim the design element grid at a boundary of the 2D surface.

11. The computing device of claim 7, wherein the instructions, when execute by the processor, cause the processor to convert the design element grid from the 2D surface to the 3D surface by mapping the design element grid from the 2D surface to the 3D surface.

12. A non-transitory computer-readable medium storing instructions that when executed by a processor of a computing device, cause the processor to:

convert a three-dimensional (3D) mesh of a 3D surface to a two-dimensional (2D) surface that is planar, wherein
  the 3D surface is part of a 3D model of a mold to be printed using a 3D printer, and
  the mold is for a molded fiber object and used during production of the molded fiber object;

determine placement of design elements on the 2D surface to maximize density of the design elements while satisfying a minimum separation distance between the design elements, wherein
  the design elements correspond to pores to be added to the 3D model such that the mold is formed with the pores when printed using the 3D printer;

convert design element placement on the 2D surface to the 3D surface;

refine the design element placement on the 3D surface to account for distortion from conversion from the 2D surface to the 3D surface; and cause the 3D printer to print the mold using the 3D model to which the pores have been added, such that the mold is formed with the pores.

13. The non-transitory computer-readable medium of claim 12, wherein the instructions, when executed by the processor, further cause the processor to:

determine curvature of the 3D surface; and adjust a separation distance of the design elements on the 3D surface based on the curvature.

14. The non-transitory computer-readable medium of claim 12, wherein the instructions, when executed by the processor, further cause the processor to:

perturb the design element placement on the 3D surface based on a spring model between the design elements to bring the design elements toward each other on the 3D surface.

15. The non-transitory computer-readable medium of claim 14, wherein the instructions, when executed by the processor, further cause the processor to:

apply a virtual force to the spring model to regulate distribution of the design elements on the 2D surface.

* * * * *